United States Patent
Snowdon et al.

(10) Patent No.: US 7,287,024 B2
(45) Date of Patent: Oct. 23, 2007

(54) FLEXIBLE RULE-BASED RECOMMENDER SYSTEM FOR USE WITH AN ELECTRONIC BOARD SYSTEM

(75) Inventors: Dave Snowdon, Grenoble (FR); Antonietta Grasso, Grenoble (FR); James Pycock, Huntington (GB); Richard Bentley, Cambridge (GB)

(73) Assignee: Xerox Corporation, Stamford, CT (US)

( * ) Notice: Subject to any disclaimer, the term of this patent is extended or adjusted under 35 U.S.C. 154(b) by 477 days.

(21) Appl. No.: 10/911,288

(22) Filed: Aug. 4, 2004

(65) Prior Publication Data
US 2005/0021518 A1    Jan. 27, 2005

(51) Int. Cl.
G06F 7/00    (2006.01)
G06F 17/30   (2006.01)
G06F 3/041   (2006.01)

(52) U.S. Cl. .......................................... 707/3; 345/173
(58) Field of Classification Search ............... 707/1, 707/3, 100, 102; 345/73
See application file for complete search history.

(56) References Cited

U.S. PATENT DOCUMENTS

| | | | |
|---|---|---|---|
| 5,455,906 A * | 10/1995 | Usuda | 345/536 |
| 5,528,745 A | 6/1996 | King et al. | 395/161 |
| 5,617,565 A | 4/1997 | Augenbraun et al. | |
| 5,754,939 A * | 5/1998 | Herz et al. | 455/3.04 |
| 5,819,269 A | 10/1998 | Uomini | 707/7 |
| 5,831,602 A | 11/1998 | Sato et al. | 345/175 |

(Continued)

FOREIGN PATENT DOCUMENTS

WO    WO 99/19804    4/1999

(Continued)

OTHER PUBLICATIONS

U.S. Appl. No. 10/877,565, filed Jun. 24, 2004, Grasso et al.

(Continued)

*Primary Examiner*—Sam Rimell
*Assistant Examiner*—Jared M Bibbee
(74) *Attorney, Agent, or Firm*—Jeannette M. Walder

(57) ABSTRACT

An electronic board system includes an electronic board having a screen for displaying information of interest to a work group or community, an input device for receiving information from users in a group or community to be displayed on the electronic board, a memory for storing information received from the input device and a processor for selecting which information stored in the memory to display on the screen, where and how to display the selected information on the screen and displaying the selected information on the screen. The processor selects which information to display in accordance with a predetermined relationship based on a group-based recommendation criteria and user interest. A plurality of sensors disposed behind the screen detect user interest in information displayed on the screen near the sensor. User interest may also be determined by monitoring user requests for copies of information displayed on the screen.

13 Claims, 3 Drawing Sheets

U.S. PATENT DOCUMENTS

| | | | |
|---|---|---|---|
| 5,983,214 A * | 11/1999 | Lang et al. | 707/1 |
| 5,991,735 A * | 11/1999 | Gerace | 705/10 |
| 5,999,975 A | 12/1999 | Kittaka et al. | |
| 6,127,990 A | 10/2000 | Zwern | 345/8 |
| 6,484,196 B1 | 11/2002 | Maurille | 709/206 |
| 6,493,703 B1 * | 12/2002 | Knight et al. | 707/3 |
| 6,501,463 B1 | 12/2002 | Dahley et al. | 345/173 |
| 2002/0026398 A1 | 2/2002 | Sheth | 705/37 |
| 2002/0080387 A1 | 6/2002 | Grasso et al. | 358/1.15 |
| 2002/0116291 A1 | 8/2002 | Grasso et al. | 705/27 |
| 2002/0126120 A1 | 9/2002 | Snowdon et al. | 345/440 |

FOREIGN PATENT DOCUMENTS

WO  WO 00/70504  11/2000

OTHER PUBLICATIONS

Yasuhito Suenaga, Kenji Mase, Masaaki Fukumoto, and Yasuhiko Watanabe, "Human Reader: An Advanced Man-Machine Interface Based on Human Images and Speech" Systems and Computers in Japan, Scripta Technical Journals, 1993, pp. 88-101, No. 2, New York.

* cited by examiner

FLEXIBLE RULE-BASED RECOMMENDER SYSTEM FOR USE WITH AN ELECTRONIC BOARD SYSTEM

CROSS REFERENCE TO RELATED APPLICATIONS

This application is a continuation of co-pending, co-assigned U.S. Patent Application Publication Number 2002/0126120, filed Dec. 22, 2000, to Snowdon et al., entitled "Electronic Board System."

This application is related to co-pending, co-assigned U.S. Patent Application Publication Number 2002/0116291, filed Dec. 22, 2000, to Grasso et al., entitled "Recommender System and Method," to co-pending, co-assigned U.S. patent application Ser. No. 10/877,565, filed Jun. 24, 2004, to Grasso et al., entitled "Recommender System and Method," and to co-pending, co-assigned U.S. Patent Application Publication Number 2002/0080387, filed Dec. 22, 2000, to Grasso et al., entitled "Knowledge Management System and Method."

FIELD OF THE INVENTION

This invention relates to a group-based recommender system which employs a flexible, rule-based system for selecting information to be displayed on an electronic board systems and for managing the appearance and behavior of the displayed items.

BACKGROUND OF THE INVENTION

Notice boards and bulletin boards provide a common location for groups of people and communities to post information about activities of interest to the group. They are usually located in a common area such as a print/copy room or lunch room. Some boards have rules governing the types of messages to post, but in general there are no formalities and any member of the group or community can post a message or notice. The concept is so popular, virtual bulletin boards also appear on the Internet.

Various types of writing boards are frequently used in meetings to enable the participants to take notes and display them to the group. Since a copy of the information recorded on the writing surface of the board is often desired, some boards will print a copy of the images on the board. Other boards will generate an electronic version of the information written on the screen. U.S. Pat. No. 5,455,906 to Usuda, "Electronic Board System," describes an electronic board system having a display screen, a display unit, data processor and data storage. The electronic board system enables users to input data to be displayed on the screen by: writing with a pointing device directly on the screen, providing manually written or graphics data to an image reader which scans the data and provides it to the data processor, inputting data via a writing tablet connected to the data processor, and inputting data orally through a microphone connected to voice recognition software.

In any medium to large organization there will be a number of activities occurring concurrently with varying subsets of the organization's members involved. It can become very difficult for individuals to keep track of all the activities in which they might be interested but do not have a direct involvement. Solutions exist in which reports and shared calendars are used to address this but such solutions require additional overhead to keep up to date, and must often be actively looked for. The challenge is to provide a solution that provides awareness of the activities occurring in a workplace in an informal way without requiring additional work by its users.

Large screen user interfaces have been around for many years, having being pioneered in the 1970's by Myron Kreuger (Myron W. Krueger, "Artificial Reality III", Addison-Wesley, 1991). Much recent work has focussed on the use of large screens for collaboration either between co-located or distributed users and using both 2D and 3D interfaces. In these cases the central concepts are to provide an interface which can be used simultaneously by more than one person and to provide a large working area that can fill the field of view without having to resort to "exotic" hardware such as head-mounted displays (HMDs) of the kind used for immersive virtual reality.

An example of usage of large-screens to support collaboration is the DynaWall (see Strietz, N, A, Geissler, J., & Holmer, T. "Roomware for Cooperative Buildings: Integrated Design of Architectural Spaces and Information Spaces" in N. Streitz, S. Konomi, H. Burkhardt (Eds.), Cooperative Buildings—Integrating Information, Organization, and Architecture. Proceedings of CoBuild98, Darmstadt, Germany. Lecture Notes in Computer Science, Vol. 1370. Springer: Heidelberg, 1998, pp. 4-21 and J. Geissler. "Shuffle, throw or take it! Working efficiently with an interactive wall", CHI'98 summary, pp. 265-266). DynaWall, developed at GMD, is a large screen display with an active area of 4.5×1.1 meters and a resolution of 3072×768 pixels. The DynaWall is formed by three networked, back-projected electronic whiteboards each with its own controlling personal computer. User interaction is by hand-gesture and pen input. The implementers have developed a number of interaction techniques for manipulating objects on the display. The intent of the device is to support collaborative working, apparently using applications similar to those found on standard 2D GUIs.

Let's Browse (Henry Lieberman, Neil Van Dyke, and Adriana Vivacqua, "Let's Browse: A Collaborative Web Browsing Agent", in International Conference on Intelligent User Interfaces, Los Angeles, USA, Jananuary 1999) is described as an experiment in building an agent to assist a group of people in browsing by suggesting new material likely to be of common interest. It was built as an extension to a Web browsing agent called Letizia. Letizia performs a real-time, incremental breadth first search around the user's current page, and filters candidate pages through profiles learned from observing the user's browsing activity. Users wear active badges which enable Lets Browse to detect their presence, to identify them and to have access to their profiles. One side of the display shows the currently recommended page and the other side shows the users (and extracts of their profiles) for whom the current page is being recommended. In the current implementation there is no direct user input; instead the system operates in a "channel surfing" mode in which pages are displayed as the system finds pages which have a good match with the profiles of the users currently standing in front of the display.

Silhouettell (Masayuki Okamoto, Hideyuki Nakanishi, Toshikazu Nishimura, Toru Ishida, "Silhouettell: Awareness support for real-world encounter", in Community Computing and Support Systems, Toru Ishida ed., Springer-Verlag, 1998, pp. 317-330) includes a large screen display that displays silhouettes of the users currently standing in front of it. It then displays common topics of interest and draws lines between users and topics in order to show the interests that the users have in common. A simple video based user recognition method is used which recognizes users based on the color of their clothing.

Examples of other less recent projects focusing on constructing portals to 3D include the Alive project (P. Maes, T. Darrell, B. Blumberg, and A. Pentland, "The ALIVE System: Wireless, Full-Body Interaction with Autonomous Agents", ACM Multimedia Systems, special Issue on Multimedia and Multisensory Virtual Worlds, Spring 1996) and the CAVEs projects implementing an idea from Carolina Cruz-Neira, Daniel J. Sandin, Thomas A. DeFanti, Robert V. Kenyon and John C. Hart ("The Cave—Audio Visual Experience Automatic Virtual Environment", Communications of the ACM, 35(6), June 1992, pp. 65-72).

In the Newspaper project at the Apple Advanced Technology Group, Lab members can send an email (using any email software) to an address dedicated to the Newspaper. An article with the subject of their email as the headline and the text of as the body is displayed on the front page of the Newspaper. A small picture of the sender, and an icon representing the sender's project appear next to the article. Users can view the article from a web browser on their desktop or portable computer or by simply walking through the lounge area to look at the projected display. (See Stephanie Houde, Rachel Bellamy, and Laureen Leahy. "In Search of Design Principles for tools and Practices to Support Communication within a Learning Community", SIGCHI'98, Vol. 30, No. 2.)

Despite the above-mentioned usage of large screens, there is a need to leverage the similarities between large-screens and physical notice boards. In particular there is a need to use a large-screen wide display area as a dynamic publishing medium for a community of people.

SUMMARY OF THE INVENTION

An electronic board system, according to the invention, includes an electronic board having a screen for displaying information. A plurality of sensors disposed behind or around the screen may be used to detect user interest in information displayed on the screen near the sensor. An input device receives information from users in a group or community to be displayed on the electronic board. Various types of input devices can be used including, for example, a multi-function device (MFD), a scanner, a writing board for receiving handwritten information, a personal digital assistant (PDA), an audio input device for receiving voice information or a personal computer or workstation. In some cases, the display screen may operate as an input device, in which case users may input handwritten information or point to information. Users can also use the input device as an output device to request information displayed on the screen. This information can be printed out on the MFD or emailed to the user or sent to the user in some other convenient manner. A memory stores information received from the input device. The memory can be located locally or externally, such as when the electronic board is integrated into a network or connected to a network or the Internet. A processor selects which information stored in the memory (or other data storage facilities of interest to the group or community) to display on the screen, determines where and how to display the selected information on the screen and displays the selected information on the screen. The processor selects which information to display in accordance with a predetermined relationship (or set of rules) based on a group-based recommendation criteria and user interest detected by the plurality of sensors.

The electronic board system promotes awareness of ongoing activity and other matters of interest in the workplace or community. A community may be any group of users having a common interest, including, for example, a group of shoppers in a shopping mall or store, a group of gamers in a video or game arcade, a group of shoppers in a specialty store such as a music or video store. The electronic board systems provides informal interaction and general information about the activities of the members of the workplace or community in a non-intrusive way. The electronic board system offers similar features to standard notice boards in that it can be used as a focus for social activities and anyone can post a notice without any formal approval process. However the electronic board system offers several features and advantages not found or easily provided by physical notice boards.

The electronic board system is dynamic. User comments may be updated continually so that old or less relevant comments are gradually removed and replaced by more current information. Users can watch the display screen and get an understanding of what is happening now and what has happened in the recent past. The electronic board system may also display data that is inherently dynamic such as information from Pointcast or live video or audio feeds. For example, the electronic board system could be configured to display video windows fed from cameras of other locations in the organization (other common areas, people's offices) or video from external sources such as news channels. For a community of music or video store customers, the electronic board system may display, for example, music or video clips from items most recently purchased.

The electronic board system is reactive. The electronic board system senses the areas that users are currently interested in and devotes more display space to those areas at the expense of areas in which there is less interest. The electronic board system does this using one or a combination of techniques. First, it can use sensors located in or around the electronic board to passively detect which parts of the surface people are currently standing in front of and gauge approximately the relative sizes of each group of people. If the display screen is touch sensitive or a touch selective input device is used, the electronic board system can use the items which people directly select to display. The electronic board system can also monitor all the items which users have requested output copies by all output devices.

The electronic board system can be integrated with existing information systems and local area networks or the Internet. Users can post items to the electronic board system by, for example, using macros embedded in office applications (such as Microsoft Word and Excel) or by sending the electronic board system an email address. Users can post information to the electronic board system from their desktop machines or workstations. Additionally, the electronic board system can display more traditional information such as group calendars and lists of forthcoming events. Multiple electronic board displays at different locations can be networked together, each with its own set of rules customized to the particular community or portion of the community at that location.

The electronic board system combines a dynamic display surface with a variety of input devices (such as a multi-function device, PDAs, etc.) and provides a powerful mechanism for displaying and sharing information important to an organization or community while providing a user-interface that everyone is already familiar with, the office notice-board. The electronic board system integrates concepts of screen-based information systems and paper-based interaction to provide the advantages of both in a novel way. The electronic board system uses a group-based recommender system, which displays items and topics of interest to the most members of the work group or community. If a shared calendar is also provided (i.e., a calendar which tells the electronic board system which users are present in the area and at what times), the recommended items displayed are chosen according to which members of a group are currently present in the office to see the recommendations.

DETAILED DESCRIPTION OF THE PREFERRED EMBODIMENTS

Figure 1:
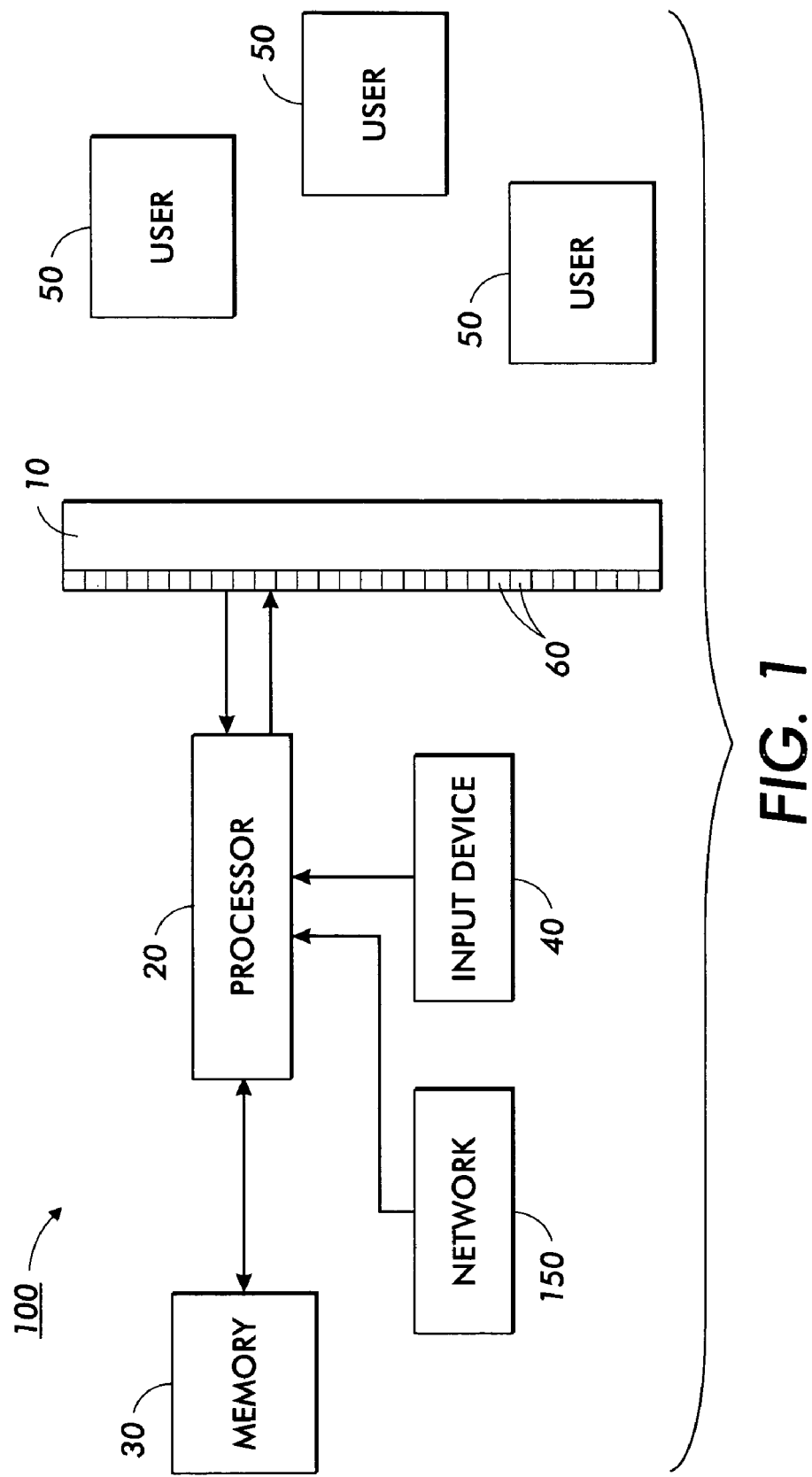
FIG. 1 is block diagram of an electronic board system according to the invention.
Figure 2:
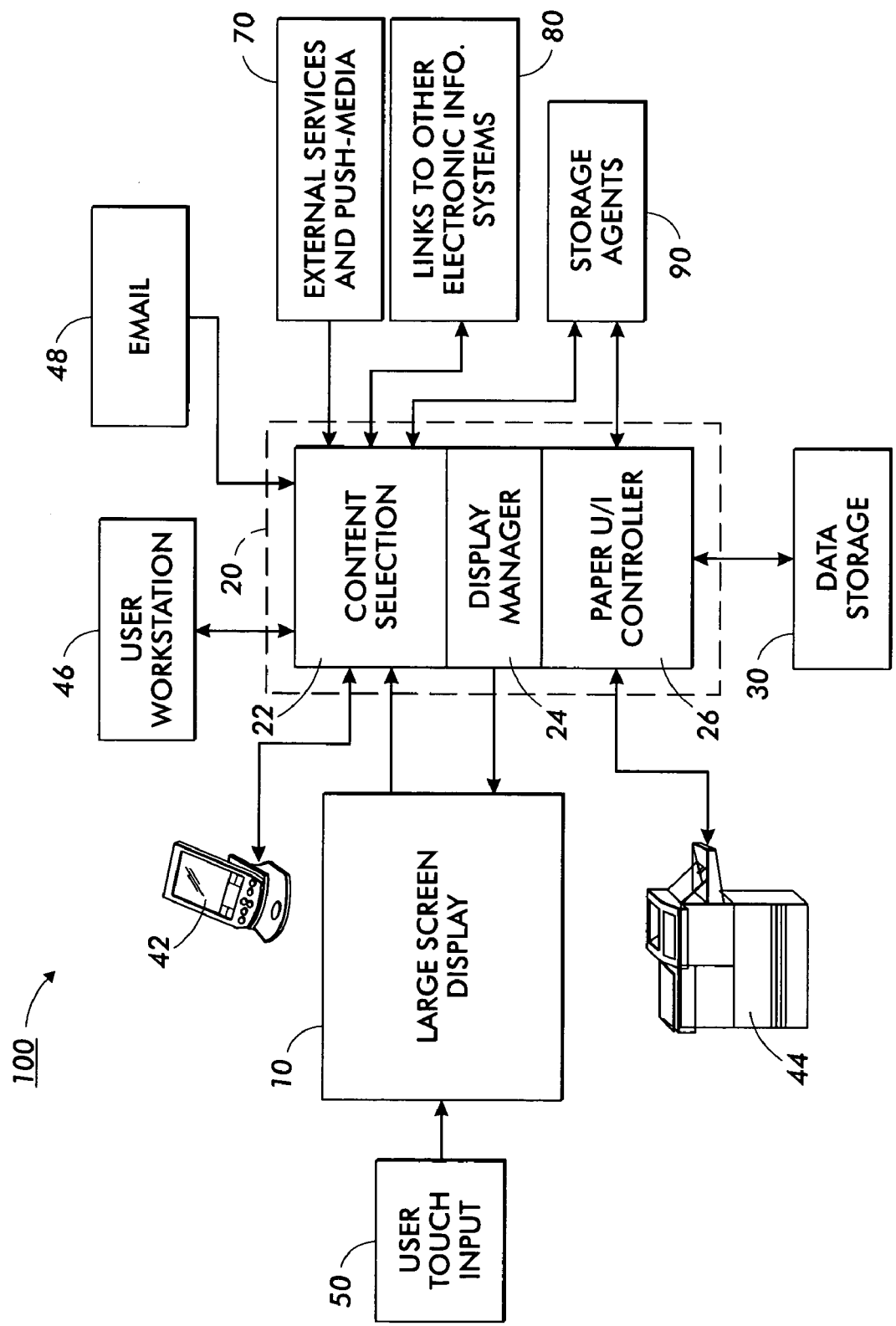
FIG. 2 is a block diagram of the architecture of the electronic board system of FIG. 1.

Referring to the figures and in particular to FIGS. 1 and 2, an electronic board system according to the invention is shown and referred to by reference numeral 100. System 100 includes a large screen display 10 on which items of information of interest to a workgroup or community of users 50 is displayed. Display 10 may be any conventional large screen display. In this embodiment, display 10 includes a plurality of sensors 60 disposed or embedded in the screen. Sensors may also be positioned around the display 10. Sensors 60 may be touch type sensors which detect user interest in an item displayed on the screen when a user touches a region near the sensor. Sensors 60 may also be motion type sensors which detect the presence of users near the region on the screen where the users may be standing or pointing. Sensors 60 may also be optical sensors or a camera which detects the presence of users near the board. In this case, when the sensors detect a user, an image of the detected user is sent to processor 20 which then compares the image with stored images of users in the workgroup or community to which the electronic board system belongs.

Processor 20 determines which items to display on screen 10 and also receives the sensor input pertaining to user interest (if sensors 60 are present on or around screen 10). Processor 20 selects items to display from memory 30. Users 50 in the workgroup or community input items of interest for display on screen 10 through input device 40. Input device 40 may be any suitable input device. Input device 40 may be a scanner, copier, multi-function device 44, personal digital assistant (PDA) 42, workstation 46 or email 48. If a multifunction device (MFD) is used as an input device, the MFD can acts as both an input mechanism, allowing users to scan new documents for the electronic board system 100 and also as an output mechanism for providing users with hardcopies of items that other user's have posted on the electronic board system. If display 10 is configured as an input device, users may input information, for example, by writing comments on the display (which are stored and converted to text by an appropriate character recognition software). Users may also input information by touching or selecting a particular area of the display 10.

There are a number of PDAs (and laptop computers) on the market which are equipped with infrared communication links, and several brands such as the Palm Computing PDAs and the PSION PDAs have achieved a high level of market penetration. If PDA 42 (or some other type of mobile device such as a cell phone or laptop computer) is used as an input device, instead of relying on an interface on the large screen display, users of PDAs equipped with infrared communications could capture comments from the screen 10 to take with them and also leave comments on items displayed on the screen.

Electronic board system 100 may be optionally connected to a network 150. Networked systems provide several possibilities for supporting awareness of remote sites either by synchronizing all displays so that they show the same information or by allowing individual electronic board systems 100 to allocate some portion of their display 10 area either to specific systems or to a more general organizational view. Remote users can also access a simulation of the display 10 via a web-based interface and so get their own picture of what is happening in the work community.

While the electronic board system may be of particular benefit in a workgroup, the system may be beneficially used by other types of communities. For example, a student dormitory in a university may have a group of electronic boards located on different floors and in common areas. While the boards may be networked together, each board may have a different set of rules for displaying items of interest. For example, a board in a common area may list ride information. A board on a floor for female students may list items of more interest to women.

The electronic board system may also be used in a shopping mall or department store. For example, a board system in a shopping mall may have multiple displays, located near different types of stores, each displaying multimedia information pertinent to the stores in its vicinity and adaptive to shoppers in the area at the time. Alternatively, shoppers may register profiles (such as for previous shopping histories), which can also be used to display information when a registered shopper is identified by a particular board. A music store, for example, may also include input from on-line communities and community websites for recommendations (e.g., a top 40 list) and submissions. The music store board system might determine what items to display based on sales charts, currently popular purchases, category of current shopper, and so on. The electronic board system may also be used for leisure activities, such as at an airport with a fixed based operator (FBO). The FBO board might display airplanes for rent, recent student solos and favorite cross country locations.

The electronic board system 100 can be viewed from a system architecture point of view as having a number of components, including input and output hardware, modules for processing the information, modules for selecting which pieces of information to display at any given moment and storage components as shown in FIG. 2.

The hardware devices include a large screen display 10 (implemented by video projection or by a large LCD flat panel display) and a multi-function device (MFD) 44. (For convenience only a MFD type of input device will be described; clearly many other types of input devices as mentioned above may be used. Also for convenience, operation of the system 100 will be described with respect to a workgroup; clearly, other types of communities may employ the electronic board system.) The MFD appears to the users as a normal office photocopier. However, the MFD is in fact a digital, not analog, device that is capable of scanning documents and storing them electronically and printing electronic documents in addition to the capabilities of a standard photocopier.

Each hardware device has an associated software module executed by processor 20 that is responsible for handling device specific requirements (such as user interaction, and layout and presentation). The central software component is a content selection module 22 which selects which of the possible information items should be represented on the screen 10 at any given moment and which handles the output of requested documents and the input of new documents via the MFD 44. Module 22 also receives information from external sources such as push-media 70, video feeds and information submitted from desktop PCs 46. Display manager 24 controls the actual output on screen 10. Paper U/I controller 26 takes input from MFD 44 and stores it in data storage 30.

The storage agents 90 are modules that interface with various external databases and information sources; these may include legacy databases located locally and on the Internet in addition to information directly maintained by the system 100. The storage agents 90 are capable of notifying the content selection module 22 when items are added to the information store thereby enabling the content selection module 22 to decide whether to update the display to reflect the new information. Content selection module 22 is also responsible for coordinating with other electronic board systems via links 80 to enable one display to show items displayed on a board situated elsewhere in the organization.

The electronic board system 100 addresses the problem of providing background awareness by combining a large screen display situated in a natural meeting place with an input device that is extremely easy to use (the office photocopier, PDA, etc.). The electronic board system 100 can be easily used. For example, a user 50 walks over to the photocopier 40 with a document that she wishes to copy. While copying the document it occurs to the user that it might be of general interest and so by pressing a button on the photocopier (which is actually an MFD) she directs the copier to make an electronic copy and store it. The systems 100 stores the electronic copy, employs an optical character recognition program to the document and classifies it according to its contexts (domains of interest). In this example the document relates to one of the subject areas currently represented on the screen 10. A representation of the document is immediately displayed on the large screen 10. In the office scenario, the screen 10 would likely be located directly above the MFD/photocopier 40.

The user 50 glances up at the large screen display 10 and notes some general information such as a calendar for the group in whose area the display 10 is situated, a reminder for a seminar that afternoon and another document posted by a co-worker from his desktop workstation. Intrigued by the title and abstract (automatically produced by the content selection engine 22 using a summarization tool) of the document, the user 50 requests a copy and one is printed immediately for her by the MFD 44. A second user approaches the screen 10. He has already noted an idea on his PDA 42 that he wishes to share with the other members of his workgroup but does not have the time to log onto his desktop workstation and send an email. As he passes the screen 10 he points his PDA 42 at it and uses the infrared communications facilities of his PDA to send the note to the system 100. At the same time his PDA downloads new comments from the system 100 which the user is then free to browse at his leisure.

Figure 3:
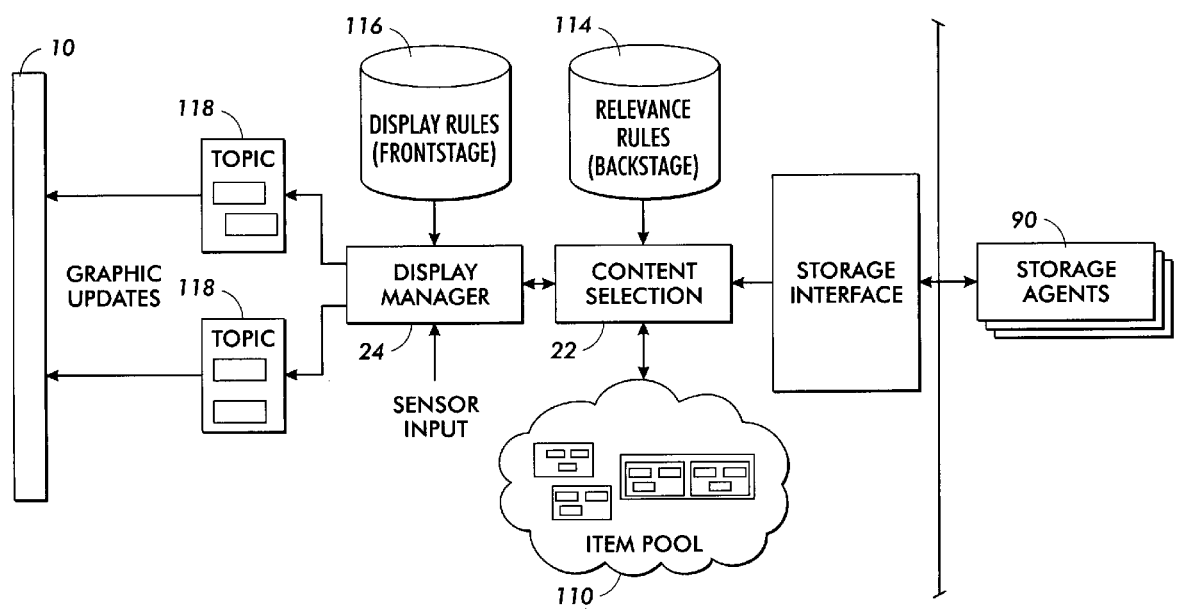
FIG. 3 is a block diagram of the display processing and control features of the electronic board system of FIG. 1.

The processor 20 controls display of items on the screen 10 in accordance with a predetermined relationship. This relationship is based on a group based recommendation criteria and user interest. The various software modules executed by the processor perform these functions. The functionality of these modules will be described with reference to FIG. 3. Content selection module 22 generally determines which information has priority on the screen 10 at a given time. Memory 30 stores an item pool 110, which is a collection of information about items which are currently being referenced by users. The system 100 keeps this information up to date and makes it available to the rules (described below) which can use this information to guide the selection of items to display. An item is "referenced" by a user, or a user indicates an interest in an item in one of many different ways, for example, when a user uploads the item via the input device, when a user uploads a comment about an item, when a user requests a copy of the item, when a user reads the item by standing near the screen 10 (which is detected by sensors 60).

Various rules are used to select the items to be displayed and to govern the manner in which items are being displayed. While each workgroup or community may select its own set of rules, the rules described in this embodiment provide for a dynamic and reactive display of items of most interest to the community or workgroup. Backstage rules 114 determine the relevance of a specific item at a specific time. The system 100 configuration specifies what rules are used and in what circumstances. The display manager 24 is responsible for the high-level management of the items displayed on screen 10. This component decides what is visible on the display and how information is displayed. It handles user-input events and triggers the appropriate service. Frontstage rules 116 determine the display characteristics of a specific item at a specific time. The system 100 configuration specifies what rules are used in what circumstances.

The display manager 24 breaks down the overall display into various topics 118. Each topic subroutine manages all visual data for a given topic (item), i.e., the large screen high level components for specific types of data (comment box, ratings etc). Depending on the implementation, these could render direct to the screen or they could build upon a standard user interface toolkit such as Swing. Topics may be, for example, for sale items, a schedule of upcoming events, lists of restaurants by type, etc.

To expand the number of items of interest and topics available, the electronic board system may be connected to external memory via the storage agents 90. Storage agents 90 provide access to one or more databases which may contain a hierarchical set of contexts (domains of interest), with which items of information are associated. Contexts define communities of interest such as architecture, Italian cuisine, and ancient monuments. (Note that a topic subroutine 118 may be associated with each context for the purposes of displaying items on the screen 10.) Items represent individual entities such as a particular museum exhibit, a museum, a restaurant, and a cathedral. Items may be associated with more than one context; for example, a restaurant might serve Italian food (and therefore be associated with Italian cuisine) while at the same time also being of architectural interest (and therefore being associated with the context(s) relevant to architecture).

Also present in the database are ratings, and comments made by users on specific items. Ratings indicate whether people like or dislike particular items and correspond to values selected from a numeric scale indicating like-dislike. Comments are either typed text or scanned hand-writing and can be anything that a person wishes to associate with a particular item. Ratings and comments are an indication of user interest and are used by content selection 22 to select which items to be displayed.

The electronic board system 100 selects the topics (or contexts) that are most representative of the community or workgroup at the current time and displays information about these topics (items) in such a way that onlookers can see which are the items of current interest to the community. The community or workgroup is the group of users served by the electronic board system. Depending on the configuration (i.e., the predetermined relationship which processes the items and user interest and the group-based recommendation criteria) this could be a particular workgroup, people whose offices are in the vicinity of the screen 10 or some other well-defined subset of the people in an organization. Once selected, items displayed are grouped by contexts (or topics) so that the display has some coherence. Items can be represented, for example, by a title, a brief description, and comments on the items and pictures of the users who have commented on that item. Onlookers can therefore see what is interesting, who is interested in it and what these people are saying about the item.

In order to maximize screen usage while preserving context, older comments (and the associated images of the commenter) may be gradually shrunk in display size and thereby progress from being full-size, to being small but legible, to being illegible but still visible, to finally vanishing altogether. This approach provides some indication of the volume of comments even if people cannot actually read them all. Optionally, ratings can be displayed alongside particular items to give another form of feedback.

An important part of the electronic board system is the selection of appropriate material to display and the management of the limited amount of screen real-estate relative to the large number of possible information items that are amassed by a moderately sized workgroup or community. Selection is determined in part by the recommendation criteria used. The content selection module 22 incorporates a recommendation system that matches the interests of the user community with the available information and selects the most appropriate information to display at a given moment.

Unlike most recommendation systems which learn the preferences of individual users, the recommendation engine deals with the preferences of a group of users and displays information that is likely to be of general interest or at least of interest to several members of a group. Implicit ratings (such as from user actions) and explicit ratings (such as from user comments and ratings) may be used by the recommendation engine. The recommendation criteria may also use additional information from a group calendar to decide who is likely to see the display on a given day and thereby further refine the choice of information to display. For example, if it is known from the calendar that a given person will not be at work on a particular day then the preferences of that person can be ignored when selecting content for display.

Content selection module 22 uses a dynamically modifiable set of rules to evaluate the items in the knowledge base and prioritize each item in terms of the likely interest to the target audience. These rules can use the ratings from the recommender system, other attributes of the item (such as the number of times it has be printed or commented on), and any current interaction or indication of user interest with the screen. Each rule applies to one or more document types so that, for example, notification of an upcoming event can be handled differently from a research paper. For example, the priority of an event might rise as the time for the event draws near and then drop to zero after the event has occurred. Whereas the priority of a research paper may not be time related and may depend on the interests of the people present on a given day and the feedback received on the paper. Based on the output of these rules the content selection module 22 produces a set of recommendations for display.

A feature of the electronic board system is that it allows for a flexible configuration of the display. This is accomplished by employing a second set of rules to customize the appearance and behavior of the items selected on the screen. In the same way that the different content selection rules are triggered according to different document types, different appearance rules are triggered according to different document types.

The electronic board system database can contain many different contexts and members of a group will likely be members of many different contexts, probably with some degree of overlap. Given the large number of possible topics represented by the different contexts, the system 100 must find the topics that are likely to be of interest. One simple method would simply be to find items ranked as interesting by the rules without reference to context but this might result in a display that is too incoherent. To provide more coherence, contexts are pre-selected according to which are deemed interesting and which give a preference to items associated with them. However, by tuning the rules of the system, very interesting items which are associated with an otherwise uninteresting context may be selected to be displayed.

The following relationship produces a ranked list of popular contexts for a group of specified users. This relationship is an extension of that used in the Knowledge Pump system (see N. Glance, D. Arregui, M. Dardenne: "Knowledge Pump: Supporting the Flow and Use of Knowledge in Networked Organizations". In: U. Borghoff, R. Pareschi (eds.), Information Technology for Knowledge Management, Springer Verlag, Berlin, 1998 and N. Glance, D. Arregui, M. Dardenne. "Making Recommender Systems Work for Organizations". In Proceedings of PAAM'99, 1999). Two parameters define the notion of popular: the number of members from a group and the degree of participation from the group members. Assume a group G of m members and a set of n contexts (for example, newsgroups, mailing lists, recommender contexts) where they have at least subscribed during the last t time.

Activity of group members: For each user the number of interactions with the each context of which they are a member or to which they have contributed are counted. Since producing information (inflow such as reviews, postings, etc.) indicates a higher level of interest and commitment, each input action gets a weight of $W_i$ and each output action (outflow such as reading, printing, etc.) gets a weight of $W_o$. It is therefore possible to construct for each user a matrix contexts x documents, where each entry $dr_{ij}$ is 1 if the user introduced the document j in the community i, 0 otherwise. On the base of the values in this matrix it is possible to associate to the user i the following vector representing the overall activity across the contexts, where $0 \leq j<n$, n=total number of contexts and where $0 \leq l<m$, m=total number of document submitted to the system Eq. 1: User inflow $$|IF_i^j|_{j=0}^{n-1} = \sum_{l=0}^{m-1} dr_{jl}$$

In the same way it is possible to construct for each user a matrix of contexts x documents visited, where each entry $dv_{ij}$ is 1 if the user followed the document j in the context of the community i, 0 otherwise. On the base of the values in this matrix, it is possible to associate to the user i the following vector representing his or her overall activity across the contexts, where 0[j<n, n=total number of contexts and where 0[1<m, m=total number of document submitted in the system Eq. 2: User outflow $$|OF_i^j|_{j=0}^{n-1} = \sum_{l=0}^{m-1} dv_{jl}$$

Given the above vectors it is possible to construct a vector representing the overall activity (inflow+outflow) of a user.

Eq. 3: User global activity $$|A_i^j|_{j=0}^{n-1} = |OF_i^j|_{j=0}^{n-1}| + |IF_i^j|_{j=0}^{n-1}$$

The resulting sums are then normalized to give a score between zero and one for each user in each of their contexts.

One issue to take into account here is normalization with respect to the number of members of the group who are members of a context. For example, very few people will be surprised by items from a context of which most of the group members are members because they will likely have already seen this information via other interfaces or have discussed it with other group members. On the other hand, items in such contexts could be deemed to be of high priority. In the system 100 users may be allowed to choose which they prefer by allowing them to configure the system to use the context selection rules that best suit their needs. Since the rules can be dynamically loaded, users can fine-tune the behavior of the system as their become experienced with it or as context membership evolves.

Most popular contexts selection: Contexts are selected by taking the M×N matrix of contexts x users. For each context j and each user i the matrix entry is the value $A_1^j$ as described above. Then the overall community activity for the group G and the community j is given by Eq. 4: group activity in the community j $$CG_j = \sum_{i=1}^{N} A_i^j$$

It is then possible to sort the list of $CG_j$ results to obtain the current set of interesting contexts for the group members.

Each value is then normalized to provide a number between 0 and 1, which is used as weight when applying a random choice among the contexts to display. In this way the contexts where most of the group members are interested and active will be more likely displayed. On the other side there will not be a strong degree of surprise coming from them for most of the people, therefore the choice to leave a possibility even if smaller for the contexts with minor participation.

Selection of most relevant documents in each context: For each context, the system computes a list of ranked documents, on the base of how much the group as a whole tends to agree with the other members of the context. First a Pearson r is computed to measure the correlation between the people associated with a context and the group average, thereby allowing the system to produce recommendations for the group in the same way as for individuals. The correlation formula is presented in Eq. 5 and shows how to produce a correlation between the group and in individual, Y. Gi represents the average rating of group members of item i. G -bar represents the average of the group's ratings. The algorithm provides values ranging from −1 (G and Y tend not to agree at all on the items they both rated), 0 (G and Y rating are not correlated) and 1 (G and Y tend to agree perfectly). It has to be noticed that the only items taken into account for these computations are only the ones at least a member of G and Y both rated.

Eq. 5: Historical agreement correlation $$r_{GY} = \frac{Cov(G, Y)}{\sigma_G \sigma_Y}$$

$$r_{GY} = \frac{\sum_i (G_i - \overline{G})(Y_i - \overline{Y})}{\sqrt{\sum_i (G_i - \overline{G}^2)} \sqrt{\sum_i (Y_i - \overline{Y}^2)}}$$

For each document is possible to compute its rating using the correlation among all the people ranking it and the group as a whole. Then the overall rating of a document is given by the weighted sum of the ratings given to it.

This is one possible scenario, using the rules mechanism below the selection of contexts described above could be combined with a different, possibly extended mechanism for selecting individual items, or vice-versa. For example, the system could employ two rules: one using the item selection method described above and the other preferring new items by combining the output of these rules we would get a composite rule that recommended items to the group that should not only be interesting but are also recent.

It is possible to compose rules to allow complex rules to be defined as combinations of simple rules. The rules to be used are specified in a system configuration file to allow the set of rules to be used to be easily changed and to vary between instances of the electronic board system. Also different rules may be specifically allowed to be applied to different document types. For example, a different criteria could be used to decide whether a time-dependent event is more interesting at a given moment than a technical report which is a more static entity. In order to reach a balance between implementation simplicity and expressive power in our prototype the actual rules themselves may be written as Java classes that conform to an interface specification. The rule classes are dynamically loaded at run-time allowing the system to be extended with new rules and allowing different instances of the system to use different rule-sets. However, another option would be to use a declarative language or an expert system shell to provide a more powerful high-level alternative to writing rules in Java.

In one embodiment the system employs three types of rules: backstage rules 114 of which there are two subtypes, control the priority of information items and item contexts and are used to find which items and contexts are currently "interesting". Frontstage rules 116 are used to control the rendering of items on the large screen display. One type of backstage rule allows contexts to be prioritized (for example, using the relationship described above) and the second type allows individual items to be prioritized. Backstage rules may be specified in a configuration file according to the following grammar.

```
<BACKSTAGERULES>     : BACKSTAGE { <RULES> }
<RULES>              : <RULE>
                     | <RULE> <RULES>
<RULE>               : <ITEMRULE>
                     | <CONTEXTRULE>
                     | AT <TIMEDATE> <ITEMRULE>
                     | AT <TIMEDATE> <CONTEXTRULE>
                     | EVERY <TIMEINTERVAL> <ITEMRULE>
                     | EVERY <TIMEINTERVAL> <CONTEXTRULE>
<ITEMRULE>           : RULE <DOCTYPE> <RULEBODY>
<CONTEXTRULE>        : CONTEXTRULE <DOCTYPE> <RULEBODY>
<RULEBODY>           : <RULENAME> ( )
                     | <RULENAME> ( <PARAMLIST> : <RULELIST>)
<RULELIST>           : <RULE>
                     <RULE> , <RULELIST>
<PARAMLIST>          : <PARAMETER>
                     | <PARAMETER> , <PARAMLIST>
<PARAMETER>          : ATTRNAME = "VALUE"
<RULENAME>           : [A-Za-z0-9_]*
<ATTRNAME>           : [A-Za-z0-9_]*
<DOCTYPE>            : The name of a document type (defined at the beginning of the
                       configuration file) that this rule applies to.
<TIMEDATE>           : HH:mm # at a given time each day
                     | dd HH:mm # at a given time on the specified day of each month
                     | MM-dd HH:mm:ss # at a given time each year at the date specified
                     | yyyy-MM-dd HH:mm:ss # on one specific year at the date and time
                       specified
<TIMEINTERVAL>       : HH:mm:ss # every HH hours and mm minutes and ss seconds
```

In this way rules can be specified as taking the output of other rules as parameters. The rules are implemented as Java classes so only the rule name and parameters need be specified in the configuration file. An example of a rule specification is:

```
BACKSTAGE {
    RULE Event EventRule(BoostPriority="yes")
    RULE Document Average( : CommentRule( ), RatingRule( ))
    CONTEXTRULE Restaurants RestaurantRule( )
    AT 12:00 RULE * ContextPriorityRule( )
    AT 19:00 RULE * ContextPriorityRule( )
    EVERY 2:00:00 RULE * Average( : CommentRule( ), RatingRule( ))
}
```

Here three item types are handled. EventRule is selected to deal with events and loads class "EventRule.class". This rule also demonstrates a rule which takes a parameter. For items of type document the rule Average (loads class "Average.class") is selected and this in turn loads two sub-rules CommentRule and RatingRule. Also a third document type Restaurants is used to select contexts which represent restaurants. This shows the use of the CONTEXTRULE keyword, which allows the relevance of contexts to be calculated. In this example, RestaurantRule gives priority to all contexts which represent restaurants and this information is used by ContextPriorityRule to update the priority of items by context at times when people might be thinking about visiting a restaurant. Finally, every two hours the Average rule is used to reset priorities back to "normal".

Implementation of the frontstage rules may be accomplished relatively simply. In this case the configuration file simply associates a single rule with a document type. Each frontstage rule contains methods that are triggered when a certain event occurs such as an item entering or leaving the display.

The electronic board system is not simply an output only mechanism; users can also interact with the display to obtain more information and to recommend new documents. Various types of input and output mechanisms may be employed:

Paper: A user can use paper based forms (such as through a Paper U/I program as FlowPort®) to input new documents into the system or to comment or rate a document displayed on the screen 10. To add a new document the user takes a FlowPort cover sheet, for example, adds some basic information, places it on top of the document and uses the MFD to scan the pages. The system then uses OCR to convert the input document to text and by performing keyword extraction, automatically classifies it into one or more contexts. Users can comment on documents or request print outs of documents by using other forms, indicating the document's reference number (displayed on the screen) and then scanning the form.

Mouse: A wireless mouse can be used to control the mouse pointer of the processor running the system software modules. This allows users to select displayed items on the E-board and use a pop-up menu to rate the item or request that it be printed.

Touch screen: Manufacturers such as SMART technologies produce display hardware that incorporates a touch sensitive screen over the display surface. Using such a device would allow users to directly touch items of interest and then use either gestures or pop-up menus to interact with the display. For example, users could rate an item, request that it be printed, or request that the system show more detail about a particular item.

PDA: Most personal digital assistants are equipped with an infrared port. This would allow the PDA to become personal user interface to the electronic board system. A user could write a comment on a document or the URL of a document at any time and while passing the system use the infrared link to "beam" the information to the system. Another option would be to add direct real-time input so that, when standing in front of the system, the user could control various aspects of the system's display.

Video input: One advantage of having an electronic display such as the electronic board system is that it can present a dynamic display which is both time-varying and dependent on the current set of users. Using a video camera and image recognition software the system may react automatically and in real-time to the presence of people in front of the display. The system may be configured to recognize that someone is standing in front of the display and perhaps count the number of people. This might cause it to stop cycling some elements of the display in order to give users a chance to read them. A higher level of sophistication would be for the system to be able to recognize where people are looking and to devote more screen space to the items which appear to be attracting their attention. The system may also recognize individual people and tailor the display to their preferences (as defined in pre-stored user preference files stored in system memory).

Email: Users may input items of interest or comment on displayed items by sending an email to the electronic board system.

Although the electronic board system provides a large screen display for the workplace, it is also possible to run a simulation on a desktop computer. This simulation can be implemented in JavaTm and delivered via the Internet to user's workstations or personal computers thereby enabling people working from home or remotely at another location to maintain an awareness of the activities of their colleagues at the office. Home workers can also participate in the display by posting information to the main screen either via email or the Internet.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for selecting items to display on an electronic board system based on relevance of the items, wherein the electronic board system includes a screen for displaying items, comprising:

for each user in a community of users having a set of contexts to which the users subscribe, determining the number of interactions with items in contexts the user is a member and the number of interactions with items in contexts the user is not a member;

for each context, evaluating the number and type of user interactions according to a first predetermined relationship;

determining the most popular contexts;

for each of the most popular contexts, selecting the most popular items according to a second predetermined relationship for evaluating user interactions with items; and displaying the most popular items in each context on the screen;

wherein the user interactions with items comprise input interactions and output interactions; and constructing a vector $A_i^j$ representing a user's overall activity, $$|A_i^j|_{j=0}^{n-1} = |OF_i^{j\,n=1}_{j=0}| + |IF_i^j|_{j=0}^{n-1}$$

where $$|IF_i^j|_{j=0}^{n-1} = \sum_{l=0}^{m-1} dr_{jl}$$

is a matrix of contexts by items with input interactions, where each entry $dr_{ji}$ is 1 if the user introduced the item j in the community i and 0 otherwise, where 0<j<n, n=total number of contexts and where 0<l<m, m=total number of items submitted to the system, and $$|OF_i^j|_{j=0}^{n-1} = \sum_{l=0}^{m-1} dv_{jl}$$

is a matrix of contexts by items with output interactions, where each entry $dv_{ji}$ is 1 if the user followed the item j in the context of the community i and 0 otherwise, where 0<j<n, n=total number of contexts and where 0<l<m, m =total number of items submitted in the system.

2. The method of claim 1, wherein an input interaction includes one of posting an item, commenting on an item, and reviewing an item; and wherein an output interaction includes one of reading an item, printing an item, copying an item and downloading an item.

3. The method of claim 1, further comprising:

determining the items having the most recent user interaction; and for each of the most popular contexts, selecting the most relevant items according to a third predetermined relationship for evaluating the most popular items and the most recent items; and displaying the most relevant items in each context on the screen.

4. The method of claim 1, further comprising applying a different second predetermined relationship for each item type.

5. The method of claim 1, further comprising a weight of $W_i$ to each input interaction and a weight of $W_o$ to each output interaction.

6. The method of claim 1, wherein the size and location of items displayed on the screen is a function of time displayed and user interest.

7. A method for selecting items to display on an electronic board system, wherein the electronic board system includes a screen for displaying items, comprising:

providing items and recommendations for items stored in the electronic board system from users in a community having at least one context to which the users subscribe;

monitoring user activity with the electronic board system, wherein user activity comprises the number of times individual users have input an item to the electronic board system and the number of times individual users have output the item from the system;

determining which items to be displayed on the screen according to a backstage rule, wherein the backstage rule prioritizes items based on most popular context and most user activity;

wherein the user interactions with items comprise input interactions and output interactions;

constructing a vector $A_i^j$ representing a user's overall activity, $$|A_i^j|_{j=0}^{n-1} = |OF_{i,j=0}^{j\,n=1}| + |IF_i^j|_{j=0}^{n-1}$$

where $$|IF_i^j|_{j=0}^{n-1} = \sum_{l=0}^{m-1} dr_{jl}$$

is a matrix of contexts by items with input interactions, where each entry $dr_{ji}$ is 1 if the user introduced the item j in the community i and 0 otherwise, where 0<j<n, n=total number of contexts and where 0<l<m, m=total number of items submitted to the system, and $$|OF_i^j|_{j=0}^{n-1} = \sum_{l=0}^{m-1} dv_{jl}$$

is a matrix of contexts by items with output interaction, where each entry $dv_{ji}$ is 1 if the user followed the item j in the context of the community i and 0 otherwise, where 0<j<n, n=total number of contexts and where 0<l<m, m=total number of items submitted in the system, determining the size and location of the selected items on the screen in accordance with a frontstage rule; and displaying the most popular items in each context on the screen.

8. The method of claim 7, wherein the frontstage rule is a function of time displayed and user interest.

9. The method of claim 7, wherein the backstage rule is a function of context most representative to a plurality of users at a current time.

10. The method of claim 7, wherein the backstage rule is based on criteria that is likely to be of general interest to a plurality of users.

11. The method of claim 7, wherein each context is ranked in accordance with the number of higher rated individual items in such context.

12. The method of claim 7, wherein the backstage rule comprises a rule for determining which items are to be displayed on the screen based on higher individual rankings.

13. The method of claim 7, wherein the backstage rule comprises a combination of a rule which selects the most interesting items to the most users and a rule which selects the most recent items.

* * * * *